June 18, 1963 W. A. KARLGAARD 3,093,891
METHOD OF PRODUCING A SHOCK ABSORBER WITH SLEEVED PISTON
Original Filed July 27, 1959
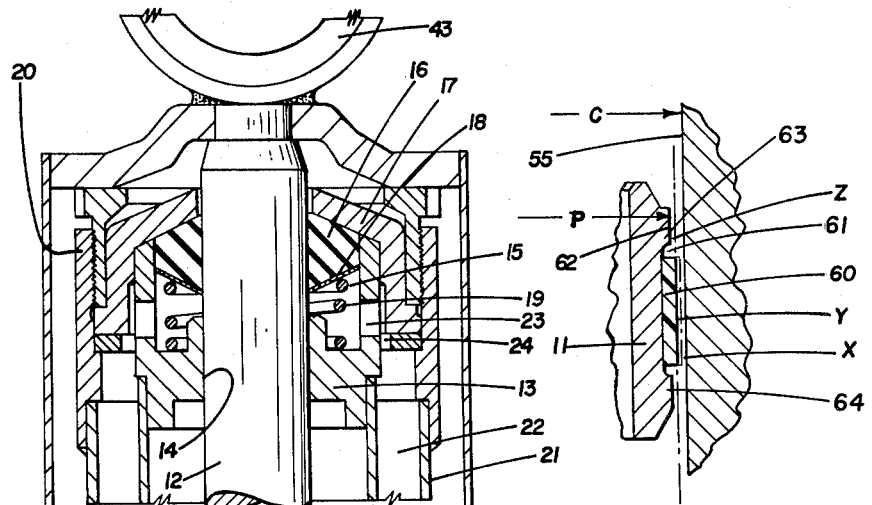
FIG. 2
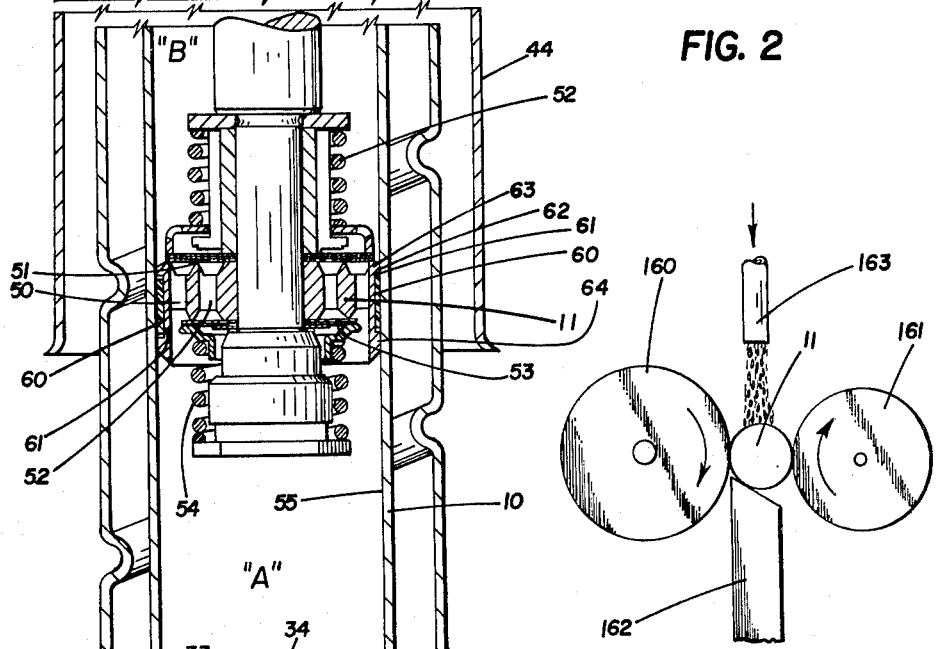
FIG. 3
FIG. 1
INVENTOR.
WAYNE A. KARLGAARD
BY
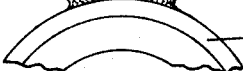
his ATTORNEY 3,093,891
METHOD OF PRODUCING A SHOCK ABSORBER WITH SLEEVED PISTON

Wayne A. Karlgaard, Englewood, Ohio, assignor to General Motors Corporation, Detroit, Mich., a corporation of Delaware
Original application July 27, 1959, Ser. No. 829,595. Divided and this application Sept. 21, 1960, Ser. No. 57,518
7 Claims. (Cl. 29—156.5)

This invention relates to hydraulic shock absorbers for vehicles, the shock absorbers being of the type wherein a piston reciprocates in a cylinder to effect displacement of hydraulic fluid through resistance valving during operation of the shock absorber to damp relative movements of the sprung mass and the unsprung mass of the vehicle.

This application is a division of Serial Number 829,595, filed July 27, 1959.

Hydraulic shock absorbers are conventionally constructed with a metal sleeve or tube forming a cylinder in which a metal piston reciprocates. The piston is conventionally attached to an actuating rod that extends through one end of the cylinder of the shock absorber through a suitable rod seal member to allow for reciprocal movement of the rod within the cylinder in effecting reciprocation of the piston in the cylinder.

Suitable resistance valving is provided in the shock absorber through which hydraulic fluid, preferably oil, is displaced on reciprocation of the piston in the cylinder whereby to damp movements between the sprung mass and the unsprung mass of a vehicle.

In the conventional shock absorbers using metal pistons in sliding engagement with metal cylinders, it is necessary that some dimensional clearance be provided between the periphery of the piston and the cylinder wall to allow for an oil lubricating film between the piston and the cylinder and thereby endeavor to avoid scoring of the piston and cylinder walls. The dimensional clearance provided between the periphery of the piston and the wall of the cylinder is maintained as low as possible, governed by practical manufacturing tolerances, to hold leakage of hydraulic fluid between opposite sides of the piston to a minimum during operation of the shock absorber. However, the minimum clearance tolerance is limited to that necessary to maintain an oil film between the piston and the cylinder wall. If the clearance factor is too small, the oil film breaks down with resultant scoring of the piston and the cylinder walls.

On the other hand, extensive use of a shock absorber ultimately results in substantial wear between the metal piston and cylinder of the shock absorber with the result the hydraulic leakage between opposite sides of the piston ultimately becomes so large as to reduce or practically eliminate the effectiveness of the resistance valving in the shock absorber through which the oil is normally displaced in the operation of the shock absorber.

The life of a shock absorber is therefore dependent upon the amount of wear occurring between the periphery of the piston and the cylinder wall in which it reciprocates, as well as on the life of the rod seal for the shock absorber.

There have been constant efforts to reduce the wear between the piston and cylinder of a shock absorber and thereby extend its life by providing extra fine finishes on the periphery of the piston and in the cylinder of the shock absorber. These efforts have made some improvement in extending the life of the shock absorber, but have not justified their cost. There has also been some effort in improving the life of the shock absorber by placing inserts of plastic material between the piston and the cylinder of the shock absorber in efforts to reduce wear, but these efforts have not been wholly satisfactory for many reasons as evidenced by the fact there is no commercial shock absorber made currently incorporating such a feature.

I have recently made certain discoveries relating to certain plastic materials and their action when placed in a shock absorber that has now made it possible to provide a sleeve or layer of plastic material on a piston for sliding engagement with the cylinder wall of a shock absorber that will insure a greatly extended life of the shock absorber, to the extent of doubling and tripling its life. Where wear between the metal piston and the cylinder and wear at its rod seal of the shock absorber have been the weak links in the life of the shock absorber, the discoveries made as a result of this invention and applied to the piston of a shock absorber has eliminated the wear factor between the piston and the cylinder as one of the weak links in the life of the shock absorber.

I have discovered that superpolyamide or polymeric material such as nylon can be applied to the piston of a shock absorber as a layer or ring in sliding engagement with the cylinder in which the piston reciprocates to effectively reduce wear between the sliding surfaces of the piston and the cylinder when properly controlled, and thereby extend the life of the device. However, I have found the hygroscopic characteristic of polymeric material or nylon produces a growth of the material when in use in a shock absorber as a result of absorption of moisture in the shock absorber which is required to be controlled when establishing critical dimensional relationships between the periphery or diameter of the piston and the inner periphery or diameter of the cylinder in which it reciprocates during manufacture, and which should be maintained under control during operation in the shock absorber to retain maximum efficiency of operation.

It is, therefore, an object of this invention to provide a shock absorber with a piston having a sleeve or layer or nylon of polymeric material applied to the periphery of the piston in a manner that the nylon surface on the piston will be only part of the piston engaging the cylinder wall under any and all operating conditions of the shock absorber with the growth characteristic of the nylon controlled in a manner to maintain pre-established dimensional limits between the piston and the cylinder.

It is another object of the invention to provide a shock absorber having the features of the foregoing object wherein hydraulic leakage between opposite sides of the piston can be greatly reduced over that of shock absorbers using conventional metal pistons in sliding engagement with metal cylinder walls.

It is another object of the invention to provide a shock absorber piston and a method for manufacturing the same whereby a sleeve or layer of nylon or superpolyamide material is placed on the periphery of the piston in a manner that the outer peripheral diameter of the layer of polymeric material will always be greater than the maximum outer peripheral diameter of the piston irrespective of the moisture absorption condition of the hygroscopic polymeric material and will also have an outer diameter that will not exceed the inner diameter of the cylinder sleeve irrespective of the moisture absorption condition of the polymeric material.

It is another object of the invention to provide a method of manufacturing a piston for a shock absorber having a sleeve or layer of nylon or superpolyamide material on the piston wherein the material is saturated with water to a state of equilibrium, that is to maximum water absorption, wherein the nylon will not absorb any additional moisture and obtains thereby its maximum hygroscopic growth, and then establish a finish external dimension on the nylon surface within pre-established limits, while maintaining the nylon in a state of complete moisture saturation that is less than minimum allowable tolerance diameter of the cylinder in which the piston will reciprocate.

Further objects and advantages of the present invention will be apparent from the following description, reference being had to the accompanying drawings wherein preferred embodiments of the present invention are clearly shown.

In the drawings:

FIG. 1 is a vertical cross-sectional view of a shock absorber incorporating features of this invention.

FIG. 2 is a schematic view illustrative of certain critical relationships maintained between the piston and the cylinder of a shock absorber and the sleeve of nylon or polymeric material applied to the periphery of the piston to accomplish the purpose of this invention.

FIG. 3 is a diagrammatic representation of a centerless grinding machine for finishing the exterior periphery of the piston of the shock absorber.

Referring to FIG. 1, which is illustrative of a direct acting type shock absorber currently in use on automotive vehicles, except as to the features relating to the invention as disclosed herein, the shock absorber is of conventional design and consists of a metal cylinder or tube 10 forming the cylinder in which the shock absorber piston 11 reciprocates. The piston 11 is carried on the lower end of an actuating rod 12 that projects through one end of the cylinder 10, as shown in FIG. 1.

The upper end of the cylinder 10 has a closure member 13 forming a guide member for a rod 12, the rod sliding within an opening 14 forming the bearing for the rod 12. The closure member 13 also has a cavity 15 providing a chamber for a resilient seal member 16 that is retained between a cap 17 and a member 18 urged toward the cap by means of the compression spring 19.

The cap 17 forms a part of the end closure member 20 that engages the upper end of the tube 21 thereby forming an oil reservoir chamber 22 between the outer tube 21 and the cylinder tube 10. Ports 23 and 24 provide communication between the seal chamber 15 and the reservoir chamber 22 to allow oil seeping into the chamber 15 along the rod 12 to drain back into the reservoir chamber 22.

The lower end of the cylinder tube 10 is closed by means of a base valve 30 constructed and arranged in a manner to provide resistance to flow of hydraulic fluid from the cylinder chamber "A" into the reservoir chamber 22, and to allow relatively free flow of hydraulic fluid from the reservoir chamber 22 back into chamber "A" of the cylinder tube.

The base valve 30 consists of a large poppet valve member 31 retained on its seat by means of a light finger spring 33 that offers substantially no resistance to upward or opening movement of the valve member 31.

The valve member 31 carries a slide valve member 34, spring urged upwardly by the spring 35 to retain the port 36 normally closed. However, hydraulic fluid under pressure in chamber "A" will move the valve 34 downwardly to open port 36 and allow fluid under pressure to pass from chamber "A" into the reservoir chamber 22 through the passage 40 formed between the cylinder tube 10 and the end closure member 41.

A fitting 42 is provided to attach the reservoir tube 21 to one part of a vehicle while a fitting 43 is provided on the rod 12 for attachment of the rod to another part of the vehicle, the shock absorber being placed between the sprung and unsprung masses of a vehicle in conventional manner. A dust tube 44 is provided around the shock absorber.

The piston 11 has a plurality of axially extending passages 50 positioned in a circle near the periphery of the piston. These passages are closed by a disk valve 51 held on annular seats on both sides of the passages 50 by the compression spring 52 normally to resist displacement of hydraulic fluid from chamber "A" below the piston 11 to chamber "B" above piston 11.

The piston 11 also has a second series of axially extending passages 52 arranged in a circle radially inwardly of the first set of passages normally retained closed by the disk valve 53 spring urged on an annular seat around the passages 52 by the compression spring 54 normally to resist flow of hydraulic fluid from chamber "B" of the cylinder tube to chamber "A."

On downward movement of the piston 11, that is on compression stroke, resistance valving 51 allows flow of hydraulic fluid from chamber "A" to chamber "B" to fill chamber "A," but with excess fluid equal to the volume of the rod entering chamber "B" being displaced through the resistance valve 34 in the base valve 30 when pressure in chamber "A" reaches a value somewhat above that required to open resistance valve 51 on the piston.

On movement of the piston 11 away from the base valve 30, that is rebound stroke, fluid in chamber "B" will be displaced into chamber "A" under control of the resistance valving 53, additional fluid to make up for the volume of fluid previously displaced being received into chamber "A" from the reservoir chamber 22 through upward opening of the valve 31.

In shock absorbers of conventional type wherein piston 11 is constructed of metal and is in operational sliding relationship with the interior cylinder surface 55 of the cylinder tube 10, sufficient clearance tolerance must be allowed between the periphery of the piston and the cylinder surface 55 to permit a film of oil to be constantly retained between the piston and the cylinder wall for the purpose of lubrication and reduction of wear of the piston and cylinder surfaces. For example, it has been established by long manufacturing practice that if the cylinder wall 55 has a minimum diameter of one inch, the maximum diameter of the piston 11 should not exceed .9980 inch which leaves a total clearance tolerance between the piston and the cylinder of .0020 inch, .0010 inch on diametrically opposite sides. This is sufficient normally to allow maintenance of an oil film between the piston and the cylinder wall to hold wear down to a practical limit.

However, dimensional tolerances are required in normal manufacturing procedure, the cylinder wall 55 having a tolerance limit of .0010 inch thereby establishing a maximum internal diameter of 1.0010 inch with the piston periphery 11 having a tolerance limit of .0005 inch from the normal diameter of .9980 inch thereby establishing a minimum diameter of .9975 inch on the piston. This establishes a clearance factor of .0035 inch maximum between the piston and the cylinder wall and reaches a clearance value that is sufficient to allow an undesirable hydraulic fluid leakage between the piston and the cylinder wall on displacement of hydraulic fluid between the chambers "A" and "B" in the manner previously described. This leakage grows increasingly worse as the walls of the piston and the cylinder wear during normal operation of the shock absorber. It has been found that the average life of a shock absorber under normal operating conditions will be from 20,000 to 30,000 miles of travel of a vehicle on which the shock absorber is carried.

Nylon resins and manufactured products made from nylon resins are hygroscopic, having an affinity for moisture in varying amounts, the percentage of moisture absorbed by the nylon depending upon the particular nylon resin composition. I have discerned that this hygroscopic characteristic of nylon must be controlled to permit use of nylon materials within hydraulic shock absorbers.

It has been the general concept of those skilled in the art that hydraulic shock absorbers are free of moisture, the temperature conditions under which they operate at high road ambient temperature either preventing moisture from entering the shock absorber or at least driving the moisture from the shock absorber if it should enter the same by accident. However, I have recently determined that an extremely high percentage of hydraulic shock absorbers if not all hydraulic shock absorbers, contain moisture in varying amounts and in substantial quantity.

Nylon or superpolyamide material has characteristics of self-lubrication and resistance to abrasion that makes it a desirable material to use as a bearing surface. Heretofore, nylon has not been used successfully as a bearing surface for pistons in a shock absorber, commercially, possibly because of the revealing fact which I just recently discovered, to wit, the major number if not all shock absorbers in use on vehicles today contain water in a sufficiently free state to permit absorption by the hygroscopic nylon, and in sufficient volume to establish complete water saturation of the nylon. Revelation of this fact, the existance of which was considered improbable by those skilled in the art, brought about a new concept in controlling the growth of the nylon, considered as an undesirable characteristic, by establishing and maintaining the nylon in a state of complete water saturation during manufacturing operations on the piston.

For example, a nylon manufactured by E. I. Du Pont de Nemours & Co., Inc. of Wilmington, Delaware, sold under their trade name "Zytel" and known as "Zytel 101" has a water absorption factor of 1.5%. Other nylons made by Du Pont and sold under the trade name "Zytel" have water absorption factors, for example, as follows:

|  | Percent |
|---|---|
| "Zytel 31" | 0.4 |
| "Zytel 63" | 2.0 |

Specifically, the nylon used in this invention is that manufactured by E. I. Du Pont de Nemours & Co., Inc. of Wilmington, Delaware and sold under their trade name "Zytel", specifically "Zytel 101." The moisture content of "Zytel 101" at equilibrium condition or complete saturation of 8.5%, by weight, of the total volume of an article made from nylon and will, therefore, have a considerable effect on any prestablished dimensional tolerances for the product. Specifically, "Zytel 101" has a dimensional growth at equilibrium moisture saturation of .025 inch per inch. Other nylons have similar growth factors at equilibrium moisture saturation, the amount of growth depending upon the degree of saturation up to equilibrium at which maximum growth of the nylon is effected.

I have found that the hygroscopic characteristic of nylon or superpolyamide plastic material can be used advantaegously both in manufacture of a nylon surfaced piston to control accurately dimensional tolerance limits on the piston during manufacture, and to improve the operating efficiency of a shock absorber by reducing leakage losses between opposite sides of the piston. If a sleeve or layer of nylon or superpolyamide plastic material is first allowed to absorb moisture to complete saturation and is then applied to the periphery of the piston 11, subsequent manufacturing processing can be controlled accurately with the physical dimensioning imparted to the nylon sleeve during manufacturing processing being retained by the nylon sleeve during its operation in a shock absorber. The life of a shock absorber containing a piston so processed will be greatly extended, from two to three times that of a conventional shock absorter using metal pistons and sleeves, and the performance characteristics of the shock absorber will be greatly improved by reduction of hydraulic leakage between opposite sides of the piston in operation of the shock absorber.

When using the term "nylon" in this specification and in the claims following, this term shall be interpreted to mean superpolyamide plastic materials of the class defined by the term "nylon" in the book entitled, "Chemistry of Commercial Plastics" by Reginald L. Wakeman, page 257, chapter 12, published 1947, the definition reading as follows:

Nylon—"Any long chain synthetic fiber-forming polymeric carbonamide which has recurring carbonamide groups as an integral part of the main polymer chain."

The nylon shall have physical characterics of capability of being moulded by injection or compression or extrusion moulding processes and shall be subject to little or no cold flow under condition of elevated temperature during operation of a shock absorber in the neighborhood of 300° F. and less.

Such nylons have good retention of mechanical properties at elevated temperature and have excellent resistance to both abrasion and the effect of organic compounds, and are in the nature of self-lubricating materials providing low coefficient of friction.

In this invention, therefore, the piston 11 is provided with an annular ring 60 of nylon positioned in an annular groove 61 recessed into the periphery 62 of the piston 11. The groove 61 extends substantially from end to end of the piston with the exception of the end portions 63 and 64 providing shoulders at each end of the piston to prevent the nylon ring 60 from slipping off the piston 11.

With the fact now known that shock absorbers do contain moisture in sufficient volume to produce complete water saturation of the nylon part used within the shock absorber, the nylon sleeve or layer on the piston must have its hygroscopic characteristic satisfied to the equilibrium condition to establish maximum growth of the nylon before and during the manufacturing operation on the piston to establish maximum external diameter of the nylon surface and to establish minimum working clearance between the outer diameter of the nylon sleeve and the inner diameter of the metal cylinder in which it operates to prevent the nylon sleeve from ever growing larger in diameter than the minimum tolerance limit for the inner diameter of the cylinder or ever shrinking below the maximum external diameter of the metal portion of the piston, in the event of loss of moisture from the nylon body. Only by such control of relationship between the exterior surface of the nylon sleeve and the cylinder and piston surface is it possible to make certain that the nylon surface of the sleeve will be that which always engages the cylinder wall.

To produce the piston 11 with the nylon rings 60 of this invention, the nylon rings 60 are first moulded by any suitable injection, compression or extrusion moulding process. Such moulding processes involve heating nylon powder to a suitable moulding temperature at which the nylon rings are moulded in suitable dies and then cooled before ejection from the machine. The nylon rings 60 are, therefore, moulded under conditions in which the body of nylon in the ring is devoid of moisture. The rings are moulded to minimum controlled dimensions within certain tolerance limits under these dry conditions such that when the ring grows in diameter in direct proportion to the moisture content of the nylon body, with maximum growth occurring when moisture saturation has been reached or a state of equilibrium of moisture content has been established, the minimum dimensional tolerance limit on the inside diameter of the ring is still less than the minimum dimensional tolerance limit on the groove 61 of the piston.

The moulded nylon ring is then placed in a body of water for an extended period of time, depending upon the thickness of the body involved, sufficient to establish complete water saturation or equilibrium condition and obtain thereby maximum diametral growth of the ring. In this invention the ring 60 has a thickness of from .021″ to .024″, at equilibrium, so that it is necessary to retain the rings in water for a period of not less than 24 hours and preferably 36 to 48 hours, at which time complete water saturation or equilibrium of water content in the ring is established, and maximum growth of the ring, resulting from water absorption, has occurred. If the rings are not to be used immediately, they shall be stored in water-tight containers and preferably containers containing moisture or at least having a high humidity content to prevent any loss of moisture from the ring.

The nylon ring 60, still in a condition of complete water saturation, is then assembled onto the piston 11 by forcibly stretching the nylon ring over one or the other of the shoulders 63 or 64 to allow the ring to snap into the groove 61, an interference fit being provided between the groove 61 and the ring 60 to prevent the ring 60 from rotating on the piston.

Also, the interference fit between the nylon ring 60 and the groove 61 and the piston is such as to insure engagement of the inner diameter of the ring with the groove of the piston even when the shock absorber is operating under high ambient temperature that thermally expands the nylon ring. The coefficient of linear thermal expansion per degree F. of "Zytel 101" is $5.0 \times 10^{-5}$. By retaining the ring 60 in positive forceful engagement with the groove 61, the amount of thermal expansion of the nylon can be accurately predicted and established relative to the maximum tolerance dimension of the outside diameter of the ring 60 so that the maximum outside diameter of the ring will not exceed the minimum inside diameter of the cylinder tube 10 even when the shock absorber is operating under pre-established maximum ambient temperature conditions with the ring 60 fully saturated with water. The two factors, water saturation and thermal expansion of the nylon, are the two growth factors of the nylon that must be taken into consideration in establishing the maximum dimensional tolerance limit of the outside diameter of the nylon ring 60 relative to the minimum dimensional tolerance limit of the inside diameter of the cylinder tube 10.

So long as the maximum tolerance limit of the outside diameter of the nylon ring 60 does not exceed the minimum tolerance limit of the inside diameter of the cylinder 10, the self-lubricating qualities of the nylon is sufficient to prevent scoring of the cylinder wall or of the nylon sleeve or ring even though the clearance factor under these conditions may be insufficient to maintain an oil film between the two surfaces.

After the ring 60 is assembled on the piston 11 in the manner heretofore mentioned, the piston is placed on a conventional centerless grinder, such as that illustrated in FIG. 3, wherein the piston 11 is placed between a grinding wheel 160 and a regulating or sizing wheel 161, the piston 11 being supported by the usual work blade 162. During the centerless grinding operation to establish the maximum outside diameter of the nylon ring 60, water continuously flows over the piston 11 from a suitable pipe supply 163. The piston must be retained in an atmosphere of water during the grinding operation to prevent any loss of moisture content from the nylon which would reduce the nylon growth below the maximum established at maximum water saturation or equilibrium condition. With the nylon being maintained fully saturated with water during the centerless grinding operation, accurate dimensional control can be established for the piston 11 with maximum outside diameter of the nylon ring being retained between pre-established tolerance limits.

Shock absorbers, typically known as one-inch shock absorbers, were constructed in accordance with this invention had have exhibited greatly extended life periods of two to three times that of a conventional shock absorber in which the metal surface of the piston engages the metal surface of the cylinder in which it operates. In such shock absorbers the dimensional tolerance limit on the cylinder tube 10, on inside diameter, is from 1.000 inch to 1.0010 inch. The nylon ring 60, as assembled on the piston and water saturated to equilibrium, has the outside diameter finished between a low dimensional limit of .9990 inch and a high limit of .9995 inch. Thus it will be seen that there is only a dimensional clearance of .0005 inch, total on both sides of the piston, between the maximum outside diameter of the ring 60 and the minimum inside tolerance limit of the cylinder tube 10. This dimensional limit is that established when the nylon ring is fully water saturated and, therefore, at maximum growth, disregarding thermal expansion. The clearance limit of .0005 inch is sufficient to allow for thermal expansion of the nylon ring 60 without exceeding the minimum tolerance limit of the inside diameter of the cylinder tube 10 under conditions of high ambient temperature pre-established under tests conditions of 300° F., which temperature is normally above the maximum temperature at which the shock absorber will operate on a vehicle in normal operation on a highway.

It has also been established that the growth of the nylon from thermal expansion on temperature rise of ambient conditions in which the shock absorber is operating is more accurately controlled by establishing an interference fit between the inside diameter of the nylon ring 60 and the diameter of the groove 61 to be maintained at all times regardless of whether the nylon ring is fully saturated to equilibrium condition or is completely desaturated.

By establishing an interference fit between the nylon ring 60 and the groove 61, the diameter of the groove establishes a predetermined dimensional factor from which growth of the nylon resulting from thermal expansion can be calculated to add to the calculated growth of the nylon resulting from complete water saturation and thereby establish a maximum outside diameter of the nylon ring that will not exceed the minimum inside diameter of the cylinder tube 10 under normal ambient temperature conditions in which the shock absorber is adapted to operate. If the nylon grows to such an extent as to apply radial pressure on the wall of the cylinder tube by exceeding the minimum inside diameter, frictional resistance is created within the shock absorber changing its overall performance.

Again using the example of the one-inch shock absorber, and using a ring 60 having a thickness of from .021 to .024 inch, at equilibrium saturation, the nylon ring shall have an inside diameter in the dimensional tolerance of from .942 to .947 inch with the outside diameter of the groove 61 having a dimensional tolerance of .964 to .966 inch. Such a dimensional relationship establishes an interference fit between the inside diameter of the ring and the diameter of the groove which is from .017 to .024 inch when the nylon ring is fully saturated and, of course, greater than that when the nylon is completely desaturated.

The interference fit provided between the groove 61 and the inside diameter of the nylon ring 60 is such that should the nylon ring become desaturated at any time during operation of the shock absorber the only change occurring to the outside diameter of the nylon ring will be the decrease resulting from shrinkage caused by desaturation of the ring, the inside diameter of the ring being retained fixed by the dimension of the groove 61. This provides more accurate control of the dimensional clearance between the outside diameter of the nylon ring and the inside diameter of the cylinder tube 10 since the inside diameter of the nylon ring will always have a fixed dimension established by the diameter of the groove 61.

By following the teachings of this invention a shock absorber cylinder tube and piston arrangement can be established which even under the worst dimensional tolerance conditions, occurring when the nylon is desaturated, is at least equal to the dimensional tolerance relationships allowed in normal manufacturing operations for a metal piston and cylinder tube. This condition does not ordinarily exist in shock absorbers in normal and conventional operation because of the moisture that has been found to be present in the majority if not all hydraulic shock absorbers.

Again using the one-inch shock absorber as the example, the dimensional relationships previously mentioned herein, in regard to normal manufacture of metal cylinder and pistons for shock absorbers can be used as base values.

In this relationship it was shown that the dimensional clearance between the piston and the cylinder is from .002 to .0035 inch, depending upon the tolerance limits of the piston and cylinder.

According to this invention, using the example of the one-inch diameter shock absorber cylinder, the outside diameter of the nylon sleeve 60 can be held to dimensional tolerance of from .9990 to .9995 inch, dimensional tolerance on the cylinder tube 10 being from 1.000 to 1.0010 inch. It will therefore be seen that when the piston of this invention having maximum tolerance limits is placed in a cylinder tube having minimum tolerance limits, or a piston having minimum tolerance limits is placed in a cylinder having maximum tolerance limits, the clearance tolerance between the piston and the cylinder will be from .0005 to .0020 inch. It is apparent that even the worst clearance tolerance of the structure of this invention is at least equal to the best dimensional clearance tolerance allowed for a metal piston operating in a metal cylinder and the clearance tolerance decreases toward a minimum value so that, on the average, shock absorbers built in accordance with this invention will have less hydraulic leakage between opposite sides of the piston than those having metal pistons operating in a metal cylinder.

Even under the worst conditions, when the nylon ring 60 is completely desaturated, the outside dimensional tolerance of the nylon sleeve is from .9977 to .9982 establishing thereby a clearance tolerance of .0018 to .0033 which is at least equal to the clearance tolerance normally provided for metal pistons operating in a metal cylinder. But, as pointed out herein, these conditions will be abnormal because shock absorbers are now known to contain sufficient moisture for absorption by the nylon to effect complete saturation of the nylon and retain the same to its maximum growth and retain thereby the dimensional limits established during manufacture of the piston.

On the other hand, as a safety factor, it is always possible to add sufficient moisture into the shock absorber at the time of its assembly, either as free moisture or carried in the oil, to insure full and complete maintenance of moisture saturation by the nylon and thereby retain the nylon to its maximum growth condition and retain the established manufactured dimension.

It is also essential in the success of this invention that the outer diameter of the nylon ring 60 will always be greater than maximum diameter of the shoulders 62 and 64 of the piston 11 to avoid metallic engagement of the shoulders with the cylinder wall 55. Therefore, even when the nylon ring 60 is completely desaturated, the minimum outside diameter of the ring 60 under this condition of desaturation shall be greater than the maximum tolerance diameter allowed for shoulders 62 and 64. Also, the minimum outer diameter of the nylon ring 60, when completely desaturated and when at a predetermined maximum low temperature, shall remain greater than the maximum tolerance limit allowed for the diameter of the shoulders 62 and 64. Thus under conditions of maximum contraction due to complete desaturation of the ring and operation in low temperatures, the shoulders 62 and 64 will not engage the metal cylinder wall 55 at any time.

Still using the one-inch diameter shock absorber as an example, the tolerance limit on the diameter of the shoulders 62 and 64 is from .9890 to .9920 inch, whereas the tolerance limit on the outside diameter of the nylon ring completely desaturated is from .9977 to .9982 inch. Even allowing .0005 inch for contraction of the nylon ring due to low temperature conditions, which is the same value of expansion allowed on elevated temperatures, the minimum diameter of the ring will still be greater than the maximum diameter of the piston shoulder.

FIG. 2 illustrates schematically the minimal conditions necessary to establish a relationship between the piston 11 and the cylinder wall 55 at which the nylon ring 60 will always extend beyond the piston periphery and will not exceed the minimum diameter of the cylinder 55. In this figure, "C" represents the minimum tolerance limit of the diameter of the cylinder 55. The letter "X" represents the minimum clearance factor when the nylon ring 60 is fully water saturated and is the maximum tolerance diameter limit of the ring 60 relative to the minimum tolerance diameter limit of the cylinder 55. The letter "Y" represents the shrinkage factor of the nylon ring 60 on complete desaturation of the ring and represents the maximum dimensional change allowable between the minimum outside diameter of the ring 60 when fully water saturated and the maximum outside diameter of the ring 60 completely desaturated. The letter "Z" represents the minimum clearance factor between the outside diameter of the nylon ring 60 and the periphery of the shoulder 62 of the piston and is that factor established between the minimum outside diameter of the ring 60 when the ring is desaturated and the maximum outside diameter tolerance limit of the shoulder 62. With these factors known, the piston diameter can be formulated as follows:

$$P = C - X - Y - Z$$

Even under accelerated test conditions, shock absorbers built in accordance with the teachings of this invention exhibit an improved cylinder tube surface, reaching a mirror polish, which greatly extends the life of the device.

While the embodiments of the present invention as herein disclosed constitute a preferred form, it is to be understood that other forms might be adopted.

What is claimed is as follows:

1. In a method of manufacturing a piston having a layer of nylon on the cylindrical periphery thereof, the steps of, saturating the layer of nylon with moisture to complete saturation or equilibrium condition to establish thereby maximum expansion of the nylon, and while the nylon is maintained saturated with moisture machining off the periphery of the nylon layer to establish thereby a finish diameter on the periphery of the moisture saturated nylon layer under the so established moisture saturated maximum expansion condition of the nylon.

2. In a method of manufacturing a piston having a layer of nylon on the cylindrical periphery thereof, the steps of, saturating the layer of nylon with moisture to complete saturation or equilibrium condition to establish thereby maximum expansion of the nylon, and thereafter while the nylon is so saturated machining a finish diameter on the periphery of the nylon layer by removing a part of the periphery of the nylon layer while concurrently maintaining the moisture saturated maximum expansion condition of the nylon by applying a water flow to the nylon surface during the finishing operation.

3. In a method of manufacturing a piston having a layer of nylon on the cylindrical periphery thereof, the steps of, saturating the layer of nylon with moisture to complete saturation or equilibrium condition to establish thereby maximum expansion of the nylon, and while the nylon is maintained so saturated with moisture machining a maximum finish diameter on the periphery of the nylon layer under the so established maximum expansion condition of the nylon at complete moisture saturation that thermal expansion of the nylon effects a diameter increase that is not greater than the minimum diameter of a cylinder in which said piston is to reciprocate.

4. In a method of manufacturing a piston having a layer of nylon on the cylindrical periphery thereof, the steps of, saturating the layer of nylon with moisture to complete saturation or equilibrium condition to establish thereby maximum expansion of the nylon, and while concurrently maintaining the nylon so saturated with moisture machining a finish diameter on the periphery of the nylon layer under the so established maximum expansion condition of the nylon at complete moisture saturation that is not greater than the minimum diameter of the cylinder in which said piston is to reciprocate and under a condition of less than complete saturation is greater than any maximum diameter of the piston body immediately adjacent the wall of the cylinder in which the piston is to reciprocate.

5. In a method of manufacturing a piston having a layer of nylon on the cylindrical periphery thereof, the steps of, producing a metal piston having an annular recess of controlled diameter in the periphery thereof extending over a major portion of the axial length of the piston, producing a nylon cylinder and then saturating the same with moisture to complete saturation or equilibrium condition to obtain maximum growth or expansion of the nylon and obtained thereby a moisture saturated nylon cylinder provided with an axial length not greater than the axial length of the recess in the piston and having a maximum tolerance inside diameter less than a minimum tolerance diameter of said recess, positioning the so saturated nylon cylinder in the said recess to effect thereby radial expansion of the nylon ring and establish thereby an outside minimum tolerance diameter on the nylon ring greater than a maximum tolerance diameter of a cylinder in which the piston will reciprocate, and thereafter while maintaining the nylon so saturated with moisture machining a finish diameter on the periphery of the nylon ring that is not greater than the minimum tolerance diameter of a cylinder in which said piston is to reciprocate by removing a part of the periphery of the nylon layer or ring while concurrently applying a water flow to the nylon surface to maintain the said complete moisture saturation of the nylon during the machining operation.

6. In a method of manufacturing a piston having a layer of nylon on the cylindrical periphery thereof, the steps of, producing a metal piston having an annular recess of controlled diameter in the periphery thereof extending over a major portion of the axial length of the piston, producing a nylon cylinder and then saturating the same with moisture to complete saturation or equilibrium condition to obtain maximum growth or expansion of the nylon and obtain thereby a moisture saturated nylon cylinder provided with an axial length not greater than the axial length of the recess in the piston and having a maximum tolerance inside diameter less than a minimum tolerance diameter of said recess, positioning the so saturated nylon cylinder in the said recess to effect thereby radial expansion of the nylon ring and establish thereby an outside minimum tolerance diameter on the nylon ring greater than a maximum tolerance diameter of a cylinder in which the piston will reciprocate and greater than any maximum tolerance diameter on the body of the piston axially of the nylon ring, and thereafter while maintaining the nylon in the so saturated condition machining a finish diameter on the periphery of the nylon cylinder under the so established maximum expansion condition of the nylon that is not greater than a minimum tolerance diameter of a cylinder in which the said piston is to reciprocate and which is greater than any maximum tolerance diameter on the body of the piston axially of the nylon ring under a condition of less than complete moisture saturation by removing a part of the periphery of the nylon cylinder while concurrently applying a water flow to the nylon surface to maintain the said complete moisture saturation of the nylon during the machining operation and establish thereby a nylon surface obtained under conditions of maximum growth of the nylon to insure reciprocable sliding engagement of the nylon cylinder with the cylinder wall in which the piston is to reciprocate.

7. The method of manufacturing a piston having a layer of nylon on the cylindrical periphery thereof in accordance with claim 6 wherein the maximum tolerance diameter established on the periphery of the nylon cylinder is not greater than the minimum tolerance inside diameter of the cylinder in which the piston is to reciprocate when including the thermal expansion factor of the nylon at the maximum temperature under which the piston and cylinder normally operate.

References Cited in the file of this patent

UNITED STATES PATENTS

| | | |
|---|---|---|
| 831,151 | Gaeth | Sept. 18, 1906 |
| 973,380 | Parker | Oct. 18, 1910 |
| 2,170,919 | Thener | Aug. 29, 1939 |